United States Patent [19]

Akiwumi-Assani et al.

[11] Patent Number: 5,532,744
[45] Date of Patent: Jul. 2, 1996

[54] METHOD AND APPARATUS FOR DECODING DIGITAL VIDEO USING PARALLEL PROCESSING

[75] Inventors: Olu Akiwumi-Assani, Beacon; Carlo Basile, Ossining; Alan Cavallerano, Ossining; Kiran Challapali, Ossining, all of N.Y.; Richard Shen, Leonia, N.J.; Karl Wittig, New York, N.Y.

[73] Assignee: Philips Electronics North America Corporation, New York, N.Y.

[21] Appl. No.: 294,124

[22] Filed: Aug. 22, 1994

[51] Int. Cl.$^6$ ........................................................ H04N 7/26
[52] U.S. Cl. ................................................. 348/390; 348/400
[58] Field of Search ..................................... 348/384, 390, 348/400, 401, 409, 415, 420, 423, 721; H04N 133, 137

[56] References Cited

U.S. PATENT DOCUMENTS

| | | | |
|---|---|---|---|
| 5,138,447 | 8/1992 | Shen et al. | 348/384 |
| 5,144,425 | 9/1992 | Joseph | 348/408 |
| 5,216,503 | 6/1993 | Paik et al. | 348/390 |
| 5,253,078 | 10/1993 | Balkanski et al. | 358/426 |
| 5,267,334 | 11/1993 | Normille et al. | 348/401 |

OTHER PUBLICATIONS

"MPEG: A Video compression Standard for Multimedia Applications", by Le Gall, in Communication of the ACM, vol. 34, No. 4, Apr. 1991.
ISO/IEC Draft 13818-2 Recommendation H.262, Nov. 15, 1993.
"Grand Alliance HDTV System Specification", Apr. 14, 1994.

*Primary Examiner*—Thai Q. Tran
*Assistant Examiner*—A. Au
*Attorney, Agent, or Firm*—Michael E. Marion

[57] ABSTRACT

A method and decoder for decoding a hierarchically coded digital video bitstream which can process a high resolution television picture in real time and which is made, up of a number of individual decoder modules, connected in parallel, which each have less real time processing power than is necessary, but which when combined, have at least the necessary processing power needed to process the bitstream in real time. The decoder includes a system controller which detects the hierarchical code indicating bits and slices and communicates this information to a slice parser which dynamically allocates the bitstream among the digital modules as needed on a per slice basis.

3 Claims, 1 Drawing Sheet

METHOD AND APPARATUS FOR DECODING DIGITAL VIDEO USING PARALLEL PROCESSING

BACKGROUND OF THE INVENTION

The Federal Communications Commission and cable television testing organizations such as CableLabs have been evaluating digital television delivery systems in order to choose a new television "standard" which someday will replace NTSC in the United states. These systems all involve digital coding and data compression techniques, for example those utilizing the MPEG digital coding algorithms or variations thereof.

The FCC plans to test and approve an advanced television (ATV) standard comprising, for example, high definition television (HDTV) (and standard definition (SDTV)) digital signals for terrestrial broadcasting, in 1994 & 1995. Although the specifics of the standard are yet to be fully determined, the FCC has indicated that the system will initially take the form of a so called "simulcast" approach. The new ATV signals will have to fit into currently unused television channels (so called "taboo" channels) and initially co-exist with conventional analog television signals without co - channel interference. NTSC will be used hereinafter to represent one example of conventional television broadcasting. Other examples would be SECAM and PAL. Although NTSC is exemplified herein, it is not meant to be construed as a limitation and will be used herein synonymously with "conventional" to represent conventional television in general.

In 1994 and 1995 the FCC will test the so called "Grand Alliance" system, a system which is being cooperatively developed by the corporate sponsors which developed the first round of individual proposals which were tested by the FCC in 1991 and 1992. This system proposes to take the best features from those systems already tested in order to present a single optimum system for FCC approval as the U.S. standard.

The Grand Alliance has already decided on a video coding algorithm which will comply with the MPEG source coding standards proposed by MPEG (Motion Pictures Experts Group). Specifically, the Grand Alliance intends to comply with MPEG II.

The Grand Alliance HDTV codec achieves a high compression ratio while preserving good picture quality to enable the delivery of high resolution video in a bandwidth-limited channel. The coding algorithm is not lossless and the video compression standard was chosen based on the need to balance high picture quality and compression ratio. Consideration was also given to the need for random access to the coded bitstream and the need for quick recovery from errors in the terrestrial transmission environment.

Although the need for random access and speedy recovery from errors is best satisfied with pure intraframe coding, obtaining good picture quality at the bit rate of about 20 megabits per second (Mbps) for a bandwidth limited terrestrial broadcast channel demands very high compression. This is not achievable with intraframe coding alone and requires a careful balance between intraframe and interframe coding and between recursive and non-recursive temporal redundancy reduction.

In the Grand Alliance system, a number of techniques are used to achieve the high video compression needed. The Grand Alliance compression algorithm, like the MPEG algorithm, uses block-based motion compensation to reduce the temporal redundancy. Motion compensation is used both for causal prediction of the current picture from a previous picture, and for non-causal, interpolative prediction from past and future pictures. The difference signal, which is the prediction error, is further compressed using the quantization of the discrete cosine transform (DCT) coefficients to remove spatial correlation. The DCT coefficients are quantized in an irreversible process that discards the less important information. The quantized DCT coefficients are run length coded to remove zero values as another step of compression. Finally, the motion vectors are combined with the residual DCT information, and transmitted using variable length codes.

Because of the conflict between the requirements for rapid picture acquisition and highly efficient compression, three picture types are defined in the Grand Alliance HDTV/MPEG compression layer.

Intra coded pictures (I-Pictures) are coded without reference to other pictures. They also provide access points to the coded sequence where decoding and picture insertion can begin and are spatially coded with moderate compression.

Predictive coded pictures (P-Pictures) are coded more efficiently using motion compensated prediction from a past I-picture, and a P-picture can also be used as a reference for further prediction.

Bidirectionally-predictive coded pictures (B-Pictures) provide the highest degree of compression but require both past and future reference pictures for motion compensation.

The organization of the three picture types into a coding sequence is very flexible. The choice is left to the encoder and depends on the requirements of the application.

Details of the MPEG and MPEG II coding algorithms are explained in "MPEG: A Video Compression Standard for Multimedia Applications", by Le Gall, *Communication of the ACM*, vol.34, number 4, Apr. 1991, and ISO/IEC Draft 13818-2 Recommendation H.262, Nov. 15, 1993, which are both incorporated by reference herein.

The powerful and flexible MPEG coding algorithms result in an output bitstream that is both peaky and bursty. One object of the instant invention is to provide a decoder which can process this type of bitstream in an effective and efficient manner.

The structure of the coded bit stream as defined by the Grand Alliance and MPEG utilizes a layered approach as illustrated in Table I. These layers provide for additional local entry points for decoding and program insertion.

TABLE I

| LAYERS OF MPEG CODED BITSTREAM |
| --- |
| Sequence Layer |
| Group of Pictures Layer (GOP) |
| Picture Layer |
| Slice Layer |
| Macroblock Layer |
| Block Layer |

The top four layers of the coded bit stream contain only fixed length codes which generally describe the picture structures, code book assignments for decoding, and some of the global compression decisions. The number of code words in these four layers does not vary significantly and is also independent of the coding decision. Starting with the Macroblock layer however, variable length codes are used and the number and length of code words vary therefore with the coding decision made by the encoder. Most compression of a picture is achieved in the Macroblock and Block layers and therefore, another object of the invention is to provide a decoder which will process a bitstream containing variable length codes in a manner which will permit maximum use of decompression hardware and software.

SUMMARY OF THE INVENTION

The instant invention comprises a decoder which will process the digital video bit stream provided by an MPEG encoder, for example the bit stream provided by the Grand Alliance digital television signal. The decoder utilizes an adaptive distributive parallel processing approach to manage real time decoding with minimum hardware requirement, throughput delay, and encoder constraints.

The decoding of Macroblock and Block layer code words requires a tremendous amount of computation power and storage elements. For example, the average bitrate for 60 Hertz interlaced pictures in a 6 MHz channel is on the order of 0.6 Mbits per frame. The maximum size of a picture is limited by the Grand Alliance television standard to 8 Mbits, as described in "Grand Alliance HDTV System Specification", Apr. 14, 1994, incorporated by reference herein. This maximum picture size represents the peak demand for a video decoder. The ratio between the two bitrates is about 13 to 1. The instant invention therefore, provides a video decoder architecture which can handle this peak demand.

The decoding of code words in accordance with the Grand Alliance (and/or other MPEG compliant digital video standards) is a real time process with a fixed time allotment; therefore, the instant invention comprises a video decoder which is also designed to deal with worst case peak rates for a picture.

Since the bitstream received by the decoder contains variable length codes, the distribution of code words is not known until some form of decoding is performed. Since a Grand Alliance/MPEG layered bitstream is sequential in nature, until some form of decoding takes place, there is no knowledge of the size of a picture in terms of the number of code words. The instant invention therefore comprises an intelligent distributive parallel processing system which dynamically partitions the bit stream representing a Grand Alliance/MPEG encoded picture into a plurality of decodable subset bitstreams. The partition decision is adaptive in order to distribute an equal number of code words among a plurality of decoder circuits which themselves each have limited processing power.

DETAILED DESCRIPTION OF A PREFERRED EMBODIMENT OF THE INVENTION

Figure 1:
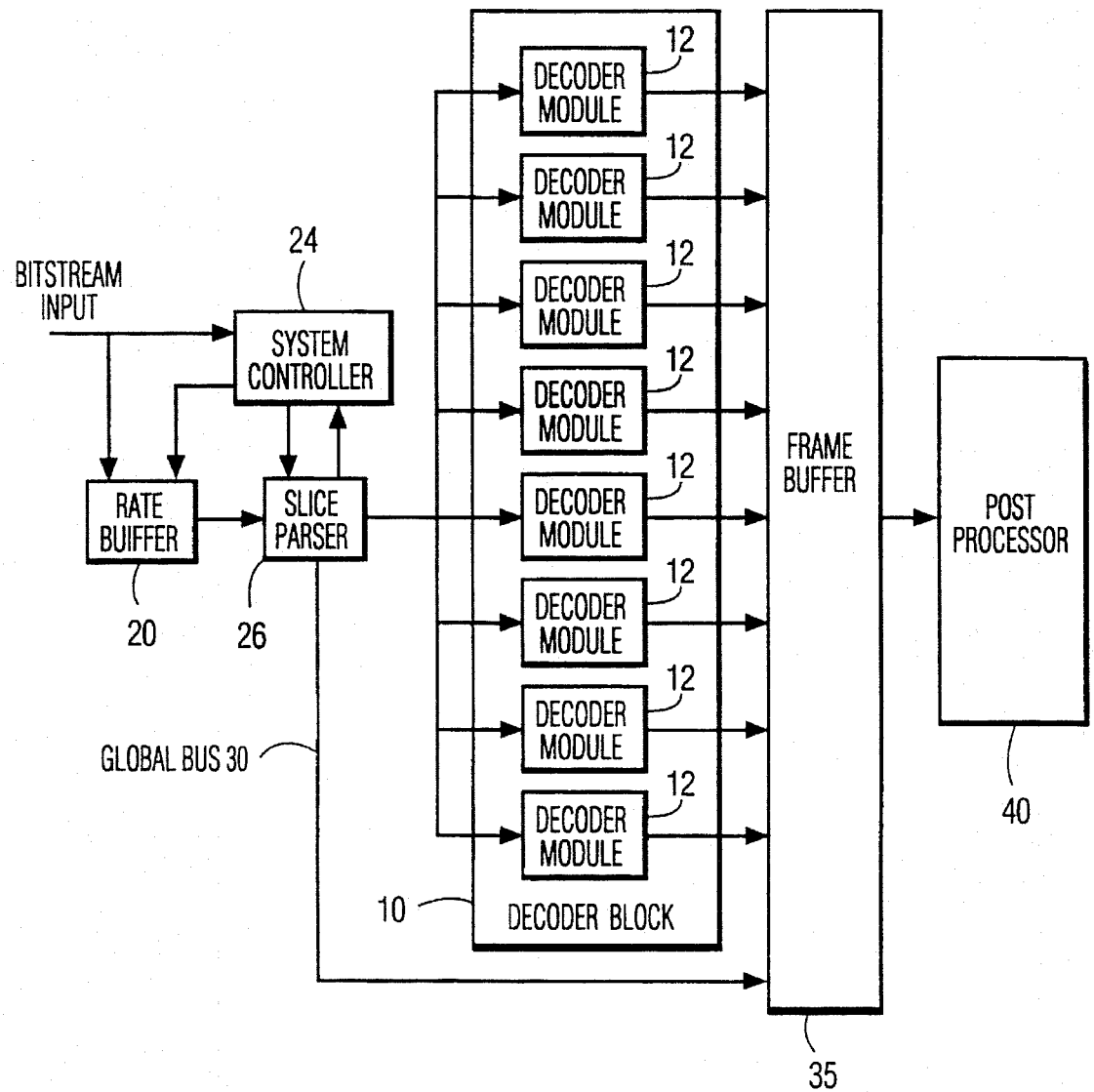
FIG. 1 is a video decoder in accordance with a preferred embodiment of the invention.

In accordance with the Grand Alliance proposed standard and the MPEG constraints, the amount of processing power needed to decode a particular bitstream will vary with the characteristics of the picture represented by the bitstream. For example, if a variable coded bitstream represents a high definition picture, the processing power needed to decode the picture will be greater than if the bitstream represents a picture with a lower degree of resolution, for example a picture with the resolution of a conventional NTSC picture. In addition, different portions of the picture will require different amounts of processing power depending on detail and motion present in each portion.

FIG. 1 describes a video decoder in accordance with the invention. Decoder block 10 is made up of a plurality of decoder modules 12 each having a fixed throughput capacity.

The decoder modules 12 are each currently available video decoders of known design which can process low resolution digital video MPEG coded bitstreams in real time, for example, ICs which perform DCT and IDCT functions are available from LSI Logic (L64735GC-35), ICs which perform quantizer and inverse quantizer functions are available from IDT (7217L25G) and digital signal processors (DSP) are available from Texas Instruments (TMS320C50).

"Real time" is defined herein as the ability to generate for display one frame's worth of video in one frame period, for example 1/30th of a second.

Each decoder module 12 comprises a variable length decoder buffer in series with a variable length decoder and a decode engine which performs inverse DCT and quantization functions in accordance with the MPEG (MPEG II) protocol described in the references incorporated herein.

The total decoder throughput represented by the decoder block 10 is used by the video decoder to decode bitstreams representing different types of pictures which each may require different and dynamically changing decoder processing power.

In the example shown, each decoder module 12 can process up to 9 MPEG "slices". MPEG defines a slice as a group of macroblocks representing a portion of the physically displayed total picture. The size of the slice can vary but can never exceed a single line length. For example, a slice can have up to 120 macroblocks which each represent a maximum of 1/68th of the available image area. In this format we must therefore process 68 slices among the eight decoder modules 12 in order to process the total image. The greater the amount of detail present in a particular slice, the greater the processing power needed to decode that slice, hence, if a particular slice is more detailed, it may require that more than one decoder module 12 be used to handle that particular slice at a given instant of time. Conversely, if a particular slice is less detailed, it may provide the additional processing power needed for a more detailed slice.

Initially, the total number of bits representing a frame is assumed to be distributed evenly among all the slices. The average number of bits per slice is therefore equal to the total number of bits for the frame divided by the total number slices in the frame. The number of bits to be processed by each decoder module 12 is initially set to be equal to the average number of bits per slice multiplied by the number of slices to be processed by the respective decoder module 12. It is necessary therefore, to analyse the bitstream prior to decoding in the decoder block 10 in order to dynamically allocate the parallel processing power among the decoder modules 12.

The variable rate bitstream provided at the bitstream input by a transport, transmission source, recording/playback device, television receiver etc. (not shown ) is fed to rate buffer 20 and system controller 24. The bitstream consists of a serial data of various layers as specified by the MPEG protocol. Each frame of the MPEG encoded picture has a variable number of bits. An I frame will have the greatest number of bits allocated to it. B and P frames might typically require fewer bits. The decoding of each frame must be done in real time and therefore the decoding resources of the decoder block 10 must be allocated so that all of the bits of the frame can be decoded in one display time. The system controller 24 identifies the start of each frame and the size, in bits, of each frame. Design and/or programming of the system controller 24 can be done by one skilled in the digital processing art and with knowledge of the coding algorithm used by the encoder, without undue experimentation.

The system controller 24 detects start codes for each of the first three MPEG layers (Sequence layer, GOP layer and Picture layer). Using the start codes, system controller 24 can determine all of the display parameters that follow each start code, for example the sequence, group of pictures and picture layer information which describe the global characteristics of the frame, for example pixels, per line, line resolution, chroma information etc.

Using the global characteristics, the system controller 24 determines the size of each portion of the frame area, in slices, which is allocated to each of the decoder modules 12. For example, for the decoder described in FIG. 1, if a 1920 pixel by 1080 line frame is indicated by the global characteristics, initially a maximum of 9 slices are allocated to each decoder module 12.

The system controller 24 detects MPEG slice start codes which define pointers indicating the beginning of each portion of the picture area. These pointers are then stored as an array in memory in the system controller 24.

The bitstream is also provided to buffer 20 which has a constant input data rate but which outputs the data to the slice parser 26 at a data rate which varies in accordance, with the characteristics of the image of each picture frame. The design of such rate buffers are well known to those skilled in the video processing art. The image characteristics can differ from frame to frame. The rate buffer 20 is controlled by the global characteristics provided by the system controller 24.

The data from the buffer 20 is then provided to the slice parser 26, which is also controlled by the system controller 24. When the system controller 24 detects a slice, layer start code, it routes it to the slice parser 26. The slice parser 26 then decodes the slice start code to determine the display position of the particular slice within the frame.

In accordance with the MPEG protocol, the maximum total number of bits which can represent a 1920 pixel by 1080 line frame is about 9.8 million bits, Therefore, the average number of bits processed by each decoder module 12 (hereinafter referred to as BA) is equal to average number of bits per slice multiplied by the number of slices per decoder module 12, which, in the example discussed herein, is about 1.35 megabits per decoder module 12. The value of BA is stored in a memory which can be part of the slice parser 26.

Once the start code of a slice is located, the slice parser 26 begins to count the number of bits and the number of slices associated with the first slice and subsequent slices until either the initial number of slices per decoder module 12 is reached (9 in this example), or until the total number of bits is less than or equal to BA (about 1.35 megabits in this example). Up until this point the bits are routed to a first decoder module 12. After either the bit count exceeds BA or the number of slices exceeds the initial number, the slice parser 26 directs the subsequent bits received from rate buffer 20 to a second decoder module 12.

Each time the slice parser 26 directs the bitstream to a subsequent decoder module 12, the counter means in the slice parser 26 keeping track of the number of bits and the number of slices are reset to zero, and processing of the bitstream continues for the rest of the frame.

The initial number of slices per decoder module 12 may be different from the actual number of slices allocated to a particular decoder module 12 by the slice parser 26. This allocation information is sent by the slice parser 26 to the system controller 24 to adjust the pointer which was initially determined for the respective portion from the global characteristics and stored in the array. As each pointer is adjusted, it is transmitted over the global bus 30 to the frame buffer 35 where reassembly of the portions forming the frame takes place.

The separate datastreams from each of the decoder modules 12 are provided to the frame buffer 35 where they are assembled into a raster map using the pointers provided by the global bus 30. The raster map is used by a postprocessor 40 which assembles, in a manner well known in the image processing art, a video signal suitable for display, representing the complete frame.

The description provided above is intended to be exemplary and not limiting. It is to be understood that a person skilled in the art may derive from the disclosure herein, many variations and modifications within the scope of the invention as defined in the claims herein.

We claim:

1. A video decoder for decoding a coded bitstream representing a video signal coded to comprise a slice layer indicating slice information, wherein the real time decoding of a frame of the video signal requires a first quantity of real time processing capability, said video decoder comprising:

a system controller for deriving from the frame of the video signal received by said system controller a bit average and an initial number of slices;

a plurality of decoder modules, each decoder module of said plurality of decoder modules providing a respective quantity of real time processing capability, each respective quantity being individually less than the first quantity, but when added totaling at least the first quantity; and a slice parser for directing the coded bitstream on a per slice basis to a first decoder module of said plurality of decoder modules as long as the number of slices directed to said first decoder module is less than or equal to the initial number of slices and the number of bits directed to said first decoder module is less than or equal to the bit average, and for subsequently directing the coded bitstream on a per slice basis to a second decoder module of said plurality of decoder modules.

2. A video decoder as claimed in Claim 1, wherein each decoder module of the plurality of decoder modules decodes the respective slices of the coded bitstream directed to said decoder module by said slice parser into respective decoded slices, further comprising:

a frame buffer for assembling the respective decoded slices received from the plurality of decoder modules into a decoded frame using pointers supplied by said slice parser and derived from the slice information.

3. A method of decoding a coded bitstream representing a video signal coded to comprise a slice layer indicating slice information, wherein the real time decoding of a frame of the video signal requires a first quantity of real time processing capability, said method comprising the steps of:

deriving a bit average and an initial number of slices from the frame of the video signal; and directing the coded bitstream on a per slice basis to a first decoder module of a plurality of decoder modules as long as the number of slices directed to said first decoder module is less than or equal to the initial number of slices and the number of bits directed to said first decoder module is less than or equal to the bit average, and subsequently directing the coded bitstream on a per slice basis to a second decoder module of the plurality of decoder modules, wherein each of the decoder modules of the plurality of decoder modules provides a respective quantity of real time processing capability, each respective quantity being individually less than the first quantity, but when added total at least the first quantity.

* * * * *